United States Patent [19]

Stephan

[11] 3,916,026

[45] Oct. 28, 1975

[54] METHOD FOR THE PREPARATION OF GAMMA-GLOBULIN SUITABLE FOR INTRAVENOUS USE

[75] Inventor: Wolfgang Stephan, Neu Isenburg, Germany

[73] Assignee: Biotest-Serum Institut GmbH, Frankfurt am Main-Niederrad, Germany

[22] Filed: Dec. 5, 1973

[21] Appl. No.: 422,056

Related U.S. Application Data

[63] Continuation-in-part of Ser. No. 347,531, April 3, 1973, abandoned, which is a continuation of Ser. No. 153,012, June 14, 1971, abandoned, which is a continuation-in-part of Ser. No. 859,566, Sept. 19, 1969, abandoned.

[30] Foreign Application Priority Data

Sept. 19, 1968 Germany............................ 1792555

[52] U.S. Cl. .............................................. 424/177
[51] Int. Cl.² ........................................... A61K 37/00
[58] Field of Search ....... 260/112 B, 112.5; 424/177

[56] References Cited
UNITED STATES PATENTS

| | | | |
|---|---|---|---|
| 2,437,060 | 3/1948 | Williams et al. ................. | 260/112 B |
| 2,520,076 | 8/1950 | Williams et al. ................. | 260/112 B |
| 2,793,203 | 5/1957 | Schultze et al. ................. | 260/112 B |
| 2,822,315 | 2/1958 | Cohn et al. ........................ | 260/112 |
| 3,449,314 | 6/1969 | Pollack .............................. | 424/177 |
| 3,449,316 | 6/1969 | Querry .............................. | 260/112 |

FOREIGN PATENTS OR APPLICATIONS 872,122  7/1961  United Kingdom

OTHER PUBLICATIONS

Stephan et al: Chem. Abstr. 69:17412h (1968).
Stephan: Chem. Abstr. 71:47731v (1969).
Stephan et al: Chem. Abstr. 74:86019a (1971).

Primary Examiner—Lewis Gotts
Assistant Examiner—Reginald J. Suyat
Attorney, Agent, or Firm—Burgess, Dinklage & Sprung

[57] ABSTRACT

The present invention provides a process for the preparation of a non-complement-binding gamma-globulin suitable for intravenous application. A complement-binding gamma-globulin is treated with β-propiolactone. When the gamma-globulin solution being treated contains aggregates and/or hydrolases, these are preferably removed prior to treatment with one of the afore-identified compounds. When they are removed, the effective amount of β-propiolactone is between about 0.01 and 0.043 ml. per gram of protein in the gamma-globulin. If they are not removed, the amount of β-propiolactone is increased ten-fold.

5 Claims, No Drawings

METHOD FOR THE PREPARATION OF GAMMA-GLOBULIN SUITABLE FOR INTRAVENOUS USE

This application is a continuation-in-part of application Ser. No. 347,531, filed Apr. 3, 1973, now abandoned, which is a continuation of application Ser. No. 153,012, filed June 14, 1971, now abandoned, which is a continuation-in-part of application Ser. No. 859,566, filed Sept. 19, 1969, now abandoned.

BACKGROUND OF THE INVENTION

Gamma-globulin prepared by fractionation has the property of complement-binding (i.e., complement fixation) (Barandum S., Die Gamma-Globulin Therapie, S. Karger Verlag, Basle 1963). For this reason, it is not suitable for intravenous application, but is only suitable for intramuscular application. However, since antibody activity is much more complete in intravenous application and most importantly occurs immediately, there have been many attempts to develop gamma-globulin preparations suitable for intravenous application.

Two processes are already known for preparing a product suitable for intravenous application from complement-binding standard gamma-globulin. In both these processes, complement-binding standard gamma globulin, which is gamma-globulin obtained by conventional methods of fractionation such as Cohn's alcohol fractionation and Rivanol ammonium sulphate fractionation, is split by hydrolysis into the individual fragments, thus eliminating complement fixation. The term "standard gamma-globulin" used herein refers to the product of conventional fractionating processes such as those described in the literature references herein.

One of these two methods carries out the splitting using pepsin (Schultze, H. E. and Schwick, G., DMW 87, 1643 1962), whilst in the other method reliance is placed on hydrolysis with hydrochloric acid at a pH-value of 4.0 (Barandum S. and Kistler P., Vox. Sang. 7, 157 (1962). The preparations obtained have shorter residence times than native gamma-globulin (G. Riva, Helvetica Medica Acta 415, 268 (1963).

According to another known process (C. A. Janeway et al, The New England Journal of Medicine, Vol. 278 17 (1968) ), a gamma-globulin preparation suitable for intravenous application can be obtained by treating native gamma-globulin with plasmin. The gamma-golbulin molecule is less seriously degraded in this way. Unfortunately, this process is extremely complicated due both to the preparation of the plasmin and to the standardization of this enzyme. There have been no known tests on aminals to determine the compatibility of this product.

In addition to the afore-identified methods which cause more or less considerable degradation of the molecule, there is another known process in which the complement-binding property of gamma-globulin is eliminated by chemical modification. This process essentially comprises a combined treatment in which tryptophan is benzylated and lysin amidated (S. Cohen and E. L. Becker, The Journal of Immunology Vol. 100 (2), 403 (1968). This method was tested on gamma-globulin from rabbits. Unfortunately, no compatibility figures are available. However, it is known that the aromatic group introduced through benzylation has an antigenic effect (Stephan W., Zeitschrift fur Immunitatsforschung, 133, 153 (1967).

Surprisingly, it has now been found that the multi-state processes referred to above for the preparation of a gamma-globulin suitable for intravenous application can be avoided by treating products containing natural gamma-globulin, especially plasma or serum, or standard gamma-globulin with β-propiolactone. For example, in the conventional preparation of complement-binding standard gamma-globulin, the treatment may be carried out before fractionation with β-propiolactone.

SUMMARY OF THE INVENTION

The present invention provides a process for the preparation of a non-complement-binding gamma-globulin comprising admixing an effective amount of β-propiolactone with a complement-binding gamma-globulin solution. When the gamma-globulin is one in which hydrolases have not been removed, the effective amount of β-propiolactone is increased ten-fold and may even exceed that value, i.e. at least 0.43 ml. per gram of protein in the gamma-globulin solution. When the hydrolases have been removed prior to the admixture with the β-propiolactone, the effective amount thereof is between about 0.01 and 0.043 ml. (and preferably about 0.03) per gram of protein in the gamma-globulin solution.

The gamma-globulin solution is preferably an aqueous solution having a pH of between about 5 and 9 (preferably about 8) when β-propiolactone is admixed therewith. The solution is preferably retained within (or readjusted to) this range for at least 1 hour.

The invention therefore provides a process for the preparation of non-complement-binding gamma-globulin suitable for intravenous application, wherein products containing natural gamma-globulin, especially plasma or serum, or standard gamma-globulin are/is treated with β-propiolactone.

DETAILED DESCRIPTION OF THE INVENTION

When the gamma-globulin treated contains hydrolases, a portion of the β-propiolactone is rendered ineffective, presumably by hydrolysis. Therefore, it is necessary to use ten times the amount of β-propiolactone per gram of protein which would be used with a hydrolase-free solution to obtain a non-complement-fixing gamma globulin suitable for intravenous injection. When using the hydrolases free, e.g. esterase inactive, complement-binding gamma-globulin solution, the effective amount of β-propiolactone is between about 0.01 and 0.043 ml. per gram of protein.

When treating gamma-globulin solutions from which the hydrolases have not been removed, amounts somewhat larger than about 0.43 ml. per gram may be used without, however, obtaining any advantages since the product obtained is unnecessarily loaded with foreign material which is undesirable in connection with intravenous application.

The process of the present invention is effective for treating complement-binding gamma-globulin including sera, plasma, and fractionated standard gamma-globulin. The treatment with the β-propiolactone in accordance with the process of the present invention modifies the gamma-globulin solution. The modified solution exhibits an increase in the electrophoretic speed of movement of the protein particles.

In the treatment according to the invention of complement-binding gamma-globulin with β-propiolactone, the complement-binding property is eliminated. It is advisable in the case of highly aggregated products to carry out an adsorption operation before the treatment with β-propiolactone in order to remove any aggregates present.

If the treatment with β-propiolactone is accompanied by ultra-violet irradiation there is every guarantee of obtaining a material safe from risk of hepatitis.

The favorable properties of the gamma-globulin treated with β-propiolactone are demonstrated by the following tests which were carried out with a 5% solution:

1. Antibody activity and complement fixation

| Preparation | Measles | Polio I | Polio II | Smallpox Vaccine | Complement Used/0.5 ml |
|---|---|---|---|---|---|
| Gamma-globulin prepared by Subjecting human serum to Rivanol fractionation with ammonium sulphate | 1:8192 | 1:50 | 1:50 | 1:32 | 0.40 ml |
| Gamma-globulin prepared from serum treated with β-PL* by Rivanol fractionation with ammonium sulphate | 1:8192 | 1:50 | 1:50 | 1:32 | corresponds to a 0.9% NaCl-solution |

αβ-propiolactone

2. Acute compatibility in mice 100 ml/kg were administered without any reaction.

3. Chronic compatibility

The preparation is intravenously injected into rats in a dose of 20 ml/kg every two days for a period of three weeks. Each rat received a total of 10 injections totalling 200 ml/kg. The initial weight of the rat was about 80 to 100 g (no heavier than 120 g). The weight of the rats was checked daily, whilst every week a differential blood pattern was prepared and the corpuscle precipitation rate and leucocyte count determined. At the end of the test, the function of the kidneys was tested (phenol red precipitate) and in addition a macroscopic post-mortem result was carried out. There were no signs of any pathological changes in relation to the NaCl-control.

4. Antigenicity

The intramuscular and intravenous immunization of rabbits did not produce any precipitating antibodies against the group treated with β-propiolactone.

5. Clinical tests

The clinical compatibility of the products according to the invention was investigated at the DRK hospital in Berchtesgarden. 27 patients were treated intravenously with 5 ml. 3 patients were treated intravenously with 50 ml. No harmful side effects were noticed in any of the patients treated.

The following Examples further illustrate the invention:

EXAMPLE 1

100 g of commercially obtained human gamma-globulin were diluted with 2000 ml of an aqueous physiological saline solution. The resultant solution contained approximately 5% of protein and had a pH of 7.0. This solution was then subjected to an adsorption process by the addition of 2% AEROSIL 380 (40 g) and the solution was stirred for 4 hours at room temperature. It was then centrifuged for 20 minutes (all centrifuging in this Example was at 5000 revolutions per minute) and the overflow liquid removed. The precipitated AEROSIL was frozen, then thawed, and centrifuged for 20 minutes. The resultant overflow was united with the overflow from the first centrifuging and the protein value and volume determined. This gamma-globulin solution from which the hydrolases had been removed by the aforesaid adsorption was heated to 37°C and the pH set at 8.0. 0.03 ml of β-propiolactone per gram of protein in the solution was added. The pH was maintained at 8.0 for 30 minutes by addition of 1 N sodium hydroxide. The thus modified solution was diluted with a physiological saline solution to a protein content of 3%. The pH was set at 8.2, 0.25% Rivanol in approximately 100 ml of a diluting solution was added with stirring at room temperature for 30 minutes. It was then permitted to remain standing for 30 minutes at 50°C followed by filtration through a fold filter. The solution was then set at a pH of 7.0 and a 5% saline solution added and the resultant solution was stirred at room temperature for 1 hour. It was then centrifuged for 20 minutes, filtered through a fold filter, and the protein content determined. The solution was then diluted with water to a protein content of 0.3% and a pH of 7.10. 31% of $(NH_4)_2SO_4$ was then added and the pH maintained at 7.0. It was stirred at room temperature for 1 hour and then permitted to stand overnight at 5°C. It was then again centrifuged for 20 minutes, the overflow removed, and the precipitate dissolved quantitatively in about 250 ml of water and then it was placed in a dialysis apparatus and the desired product obtained.

EXAMPLE 2

1 liter of human serum was stirred for 4 hours at 20°C with 20 g of colloidal silica, for example the product marketed under the name AEROSIL (R) by Deutsche Gold- und Silber-Scheideanstalt vormals Roessler (Degussa). The product is then centrifuged for 25 minutes at 5000 r.p.m. and the supernatant liquid poured off.

The adsorbed serum is adjusted to pH 8.0 at room temperature, after which 0.043 ml of β-propiolactone per gram of protein is added. The product is left standing for 1 hour at room temperature. The pH-value is adjusted to 8.0 with 1 N NaOH and the remaining β-propiolactone is hydrolysed at 37°C by readjusting the pH to 8.0 every 30 minutes (hydrolysis around 2-½ hours). The gamma-globulin is then isolated in known manner by Rivanol fractionation with ammonium sulphate.

EXAMPLE 3

160 mg of ethylenediaminetetraacetic acid/100 ml. are added to 1 liter of human serum, the pH is adjusted to 8.0 and 0.029 g of β-propiolactone/g of protein added. The product is left standing for 1 hour at room temperature. The pH-value is adjusted to 8.0 with 1 N NaOH and the remaining β-propiolactone is hydrolysed at 37°C by readjusting the pH-value to 8.0 every 30 minutes. The gamma-globulin is then isolated in known manner, for example by Rivanol fractionation with ammonium sulphate.

EXAMPLE 4

Standard gamma-globulin solution (protein conc. 7–10%) is adjusted at 20°C to a pH-value of 8.0 and 0.43 ml of β-propiolactone per gram of protein is added. The product is left standing for 1 hour at room temperature while the pH-value is readjusted to 8.0 every 20 minutes. Hydrolysis is then carried out at 37°C over a period of some 3-½ hours during which the pH-value is readjusted every 20 minutes.

This is followed by 20 hours' dialysis against physiological common salt solution, after which the product is optionally centrifuged for 10 minutes at 5000 r.p.m.; the solution is adjusted to a protein concentration of 5.0%; and filtered under sterile conditions through a diaphragm filter.

EXAMPLE 5

10 g of lyophilised standard gamma-globulin are dissolved in 100 ml. of 0.9% of NaCl. The solution is adsorbed at pH 7.5 with 3 g of AEROSIL over a period of 2 hours at room temperature. After centrifuging, the product is adjusted to pH 8.0, 0.029 g of β-propiolactone/g of protein are added and the product left standing at 37°C/pH 8.0 until its pH-value remains constant. It is then clarified and filtered under sterile conditions.

As is apparent from the Examples, the originally hydrolases-containing complement-binding gamma-globulin solutions may be treated by an adsorption process, for example with silica, or by addition of a complexing agent as in Example 3 to remove the hydrolases.

While I have disclosed several embodiments of the present invention, it is to be understood that these embodiments are given by example only and not in a limiting sense.

What is claimed is:

1. In the intravenous application of gamma-globulin, comprising the steps of preparing a gamma-globulin solution and thereafter intravenously injecting it, the improvement which comprises admixing an aqueous complement-binding hydrolases-free gamma-gobulin solution with from about 0.01 to 0.043 ml of β-propiolactone per gram of protein in said gamma-globulin solution, whereby said solution may be stored for a prolonged period prior to injection.

2. The process of claim 1, wherein said gamma-globulin solution is serum, plasma or standard gamma-globulin.

3. The process of claim 2, wherein said serum or plasma is human serum, plasma or standard gamma-globulin.

4. In the intravenous application of gamma-globulin, comprising the steps of preparing a gamma-globulin solution and thereafter intravenously injecting it, the improvement which comprises admixing an aqueous complement-binding hydrolase-containing gamma-globulin solution with about 0.1 to 0.43 ml of β-propiolactone per gram of protein in said gamma-globulin solution, whereby said solution may be stored for a prolonged period prior to injection.

5. In the intravenous application of gamma-globulin, comprising the steps of preparing a gamma-globulin solution and thereafter intravenously injecting it, the improvement which comprises admixing an aqueous complement-binding hydrolase-containing gamma-globulin solution with at least about 0.43 ml of β-propiolactone per gram of protein in said gamma-globulin solution, whereby said solution may be stored for a prolonged period prior to injection.

* * * * *